United States Patent
Brockhoff

(10) Patent No.: US 9,669,686 B2
(45) Date of Patent: Jun. 6, 2017

(54) SUPPORT STRUCTURE FOR A MOTOR VEHICLE

(71) Applicant: BENTELER AUTOMOBILTECHNIK GMBH, Paderborn (DE)

(72) Inventor: Franz Ulrich Brockhoff, Bramsche (DE)

(73) Assignee: BENTELER AUTOMOBILETECHNIK GMBH, Paderborn (DE)

( * ) Notice: Subject to any disclaimer, the term of this patent is extended or adjusted under 35 U.S.C. 154(b) by 0 days.

(21) Appl. No.: 14/930,794

(22) Filed: Nov. 3, 2015

(65) Prior Publication Data
US 2016/0121930 A1   May 5, 2016

(30) Foreign Application Priority Data
Nov. 3, 2014   (DE) .......................... 10 2014 115 938

(51) Int. Cl.
*B60N 99/00* (2006.01)
*B60J 5/04* (2006.01)

(52) U.S. Cl.
CPC .................... *B60J 5/0444* (2013.01)

(58) Field of Classification Search
CPC ....................................................... B60J 5/0444
See application file for complete search history.

(56) References Cited

U.S. PATENT DOCUMENTS

| 5,600,931 | A | | 2/1997 | Jonsson | |
|---|---|---|---|---|---|
| 5,785,376 | A | * | 7/1998 | Nees | B60J 5/0444 296/146.6 |
| 6,082,811 | A | * | 7/2000 | Yoshida | B21C 23/205 296/146.6 |
| 6,390,534 | B1 | * | 5/2002 | Lee | B60J 5/0437 296/146.6 |
| 6,679,540 | B1 | * | 1/2004 | Graber | B60J 5/0447 296/146.6 |
| 8,727,421 | B2 | * | 5/2014 | Cohoon | B60J 5/0425 296/146.6 |

FOREIGN PATENT DOCUMENTS

| DE | 33 43 709 A1 | 6/1984 |
|---|---|---|
| DE | 44 25 572 A1 | 5/1994 |

* cited by examiner

Primary Examiner — Lori L Lyjak
(74) Attorney, Agent, or Firm — Sheridan Ross PC

(57) ABSTRACT

A support structure for a motor vehicle with a first connecting section, a second connecting section and a deformation section, which is arranged between the first connecting section and the second connecting section. The deformation section is provided in its lengthwise dimension with a recess formed from a middle web and legs joined to it by connecting regions. The deformation section is fashioned as a single piece and a) the wall thickness in the connecting regions is at least partly along the lengthwise dimension of the deformation section at least 20% larger than the wall thickness of the middle web and/or the legs and/or b) the ends of the legs have a wall thickness which for at least a portion of the lengthwise dimension of the deformation section is at least 20% greater than the wall thickness of the middle web and/or the legs.

15 Claims, 5 Drawing Sheets

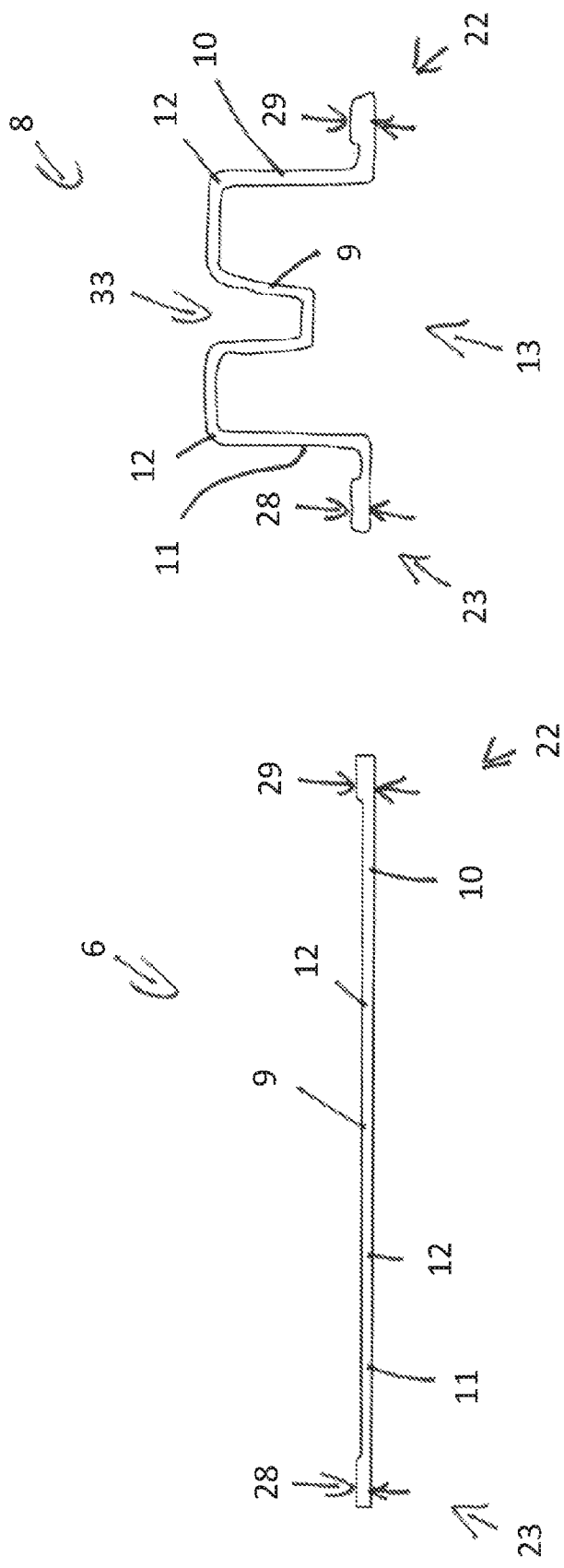

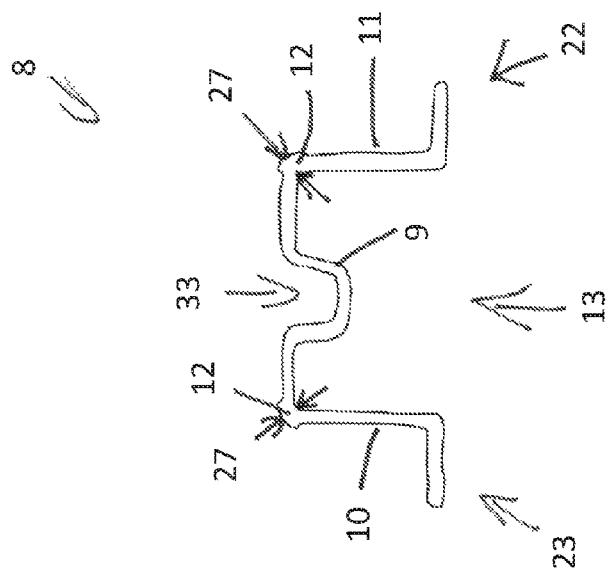
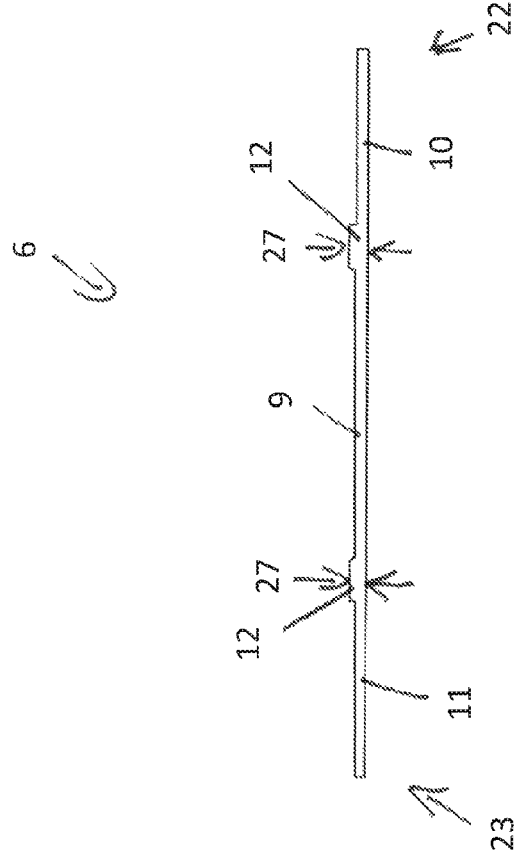

SUPPORT STRUCTURE FOR A MOTOR VEHICLE

CROSS-REFERENCE TO RELATED APPLICATIONS

This application claims the benefit of German Patent Application No. DE 10 2014 115 938.1, filed Nov. 3, 2014, the entire content of which is incorporated herein by reference.

FIELD

The invention concerns support structures for a motor vehicle according to the preamble of patent claim 1.

BACKGROUND

Such support structures for motor vehicles are generally built into side pieces of the body or in automobile doors so as to afford better side impact protection and better protect the vehicle passengers in the event of a side impact on the vehicle. Such support structures must be dimensioned so that they provide the greatest possible moment of resistance to bending, since it is known that such structural parts used in car body side pieces or automobile doors are much more heavily strained by bending than by tension during an accident. Namely, such structural parts are secured by their ends to the car body or the doors, so that upon impact from the outside such support structures act like a two-point beam in regard to the distribution of the forces and stresses acting from the outside. Hence, the bending stress in the middle region of the support structure is substantially greater than in the two end regions. In the case of a side impact, the support structure may collapse, but it then acts as a tie bar, so that impact energy is dissipated in the further course of the side impact under deformation of the attached body piece or door frame and the best possible protection is achieved for the vehicle passengers.

Such a support structure is known from DE 44 25 572A1. In the structural part shown there, the above-mentioned mechanical properties are achieved in that in a deformation section, which is arranged between a first and a second connecting section, the deformation section is provided in its lengthwise dimension with a recess formed from a middle web and legs connected to it by connecting regions, and an additional reinforcement element is installed in the recess.

Although with the structural part of DE 44 25 572A1 the safety of the passengers can be heightened as compared to structural parts without an additional reinforcement element, the use of the additional reinforcement element causes a weight increase, which results in a high fuel consumption and thus a more negative environmental balance of the motor vehicle.

SUMMARY

The problem to be solved by the invention is thus to modify a structural part for a motor vehicle such that the motor vehicle consumption of a motor vehicle in which such a support structure is installed is reduced and thus the environmental balance is improved, without having to accept disadvantages in terms of the mechanical properties, especially the bending stress and the deformation properties of the support structure, and thus also without disadvantages for the safety of the passengers.

This problem is solved by a support structure for a motor vehicle with all the features of the claimed invention, including a first connection section; a second connection section; and a deformation section, wherein the deformation section is arranged between the first connection section and the second connection section, wherein the deformation section is provided in its lengthwise dimension with a recess formed from a middle web and legs joined to it by connecting regions, and the legs run out in ends, wherein the deformation section is fashioned as a single piece and at least one of a) the wall thickness in the connection regions is at least partly along the lengthwise dimension of the deformation section and is at least 20% larger than at least one of the wall thickness of the middle web and the legs, and b) the ends of the legs have a wall thickness which for at least a portion of the lengthwise dimension of the deformation section is at least 20% greater than the wall thickness of at least one of the middle web and the legs. Advantageous embodiments of the invention will be found in the subclaims.

The support structure for a motor vehicle according to the invention has a first connecting section, a second connecting section and a deformation section, which is arranged between the first connecting section and the second connecting section. The deformation section is provided in its lengthwise dimension with a recess formed from a middle web and legs joined to it by connecting regions, and the legs run out in ends. According to the invention, the deformation section on the one hand is fashioned as a single piece. On the other hand:

a) the wall thickness in the connecting regions is at least partly along the lengthwise dimension of the deformation section at least 20% larger than the wall thickness of the middle web and/or the legs and/or b) the ends of the legs have a wall thickness which for at least a portion of the lengthwise dimension of the deformation section is at least 20% greater than the wall thickness of the middle web and/or the legs.

Thanks to such a configuration of a support structure for a motor vehicle, the bending and deformation properties of the support structure can at least be maintained with regard to the prior art and thus there are no safety disadvantages for the passengers of a motor vehicle in which such a support structure is installed, and it is not necessary to resort to a separate, additional reinforcement element for the deformation section. Thanks to the thicker formation of the walls in a) the connecting regions between the middle web and the legs of the recess joined to it, and/or b) the end regions of the legs as compared to the middle web and the legs, a substantially lighter structure is created, having no drawbacks in terms of safety-relevant aspects as compared to the support structures known from the prior art, yet distinguished by a substantially lower weight and thus better economy. In this way, it is possible to lower the fuel consumption in a motor vehicle in which at least one such support structure is installed and thus achieve a much more positive environmental balance. With the help of the support structure according to the invention it is possible to specifically design a moment of resistance such that energy is at first dissipated without the structure buckling. In the further course of an intrusion, the support structure collapses, but it then acts as a tie rod and the intrusion proceeds further under deformation of the attached car body part or door frame, and the energy of the impact is dissipated under the best possible protection aspects for the passengers.

On the one hand, it can be provided that the wall thickness of the deformation section in the connection regions along the lengthwise dimension of the support structure is at least 20% greater than the wall thickness of the middle web and/or the legs.

On the other hand, it is also conceivable for the wall thickness of the middle web and/or the legs as compared to the wall thickness of the deformation section in the connection regions between middle web and legs to be at least 20% greater, for at least a portion of its lengthwise dimension, than the wall thickness of the middle web and/or the legs.

In an especially advantageous embodiment of the invention, the variation in the wall thicknesses in the connection regions as compared to the wall thickness of the middle web and/or the legs is as much as 75%, but in any case 66%. In particular, if the support structure is made of aluminum, the greater wall thicknesses can be 4 to 6 mm, especially 5 mm, as compared to 2 to 4 mm, especially 3 mm, of the lesser wall thicknesses.

It has likewise proven itself that the ends of the legs also have a wall thickness along the lengthwise dimension of the deformation section which for at least a portion is at least 20% greater as compared to the wall thickness of the middle web and/or the legs, preferably at least 20% greater than the wall thickness of the middle web and/or the legs. This also further improves the deformation and bending properties of the support structure in regard to the safety aspects for the passengers.

In order to further improve the deformation and/or bending properties of the support structure of the invention, it has proven itself for the recess of the deformation section to be essentially U-shaped, preferably with the legs connected to the middle web of the recess being bent outward at their ends.

It has proven to be especially advantageous for the ends of the legs to extend into a connecting region of at least one of the first or second connection section, in which the actual connection of the support structure to the motor vehicle takes place. In this way, the especially good deformation and bending properties in the region of the deformation section are also extended to the region of the at least one connecting section into which the ends of the legs extend.

In terms of manufacturing technology and reducing labor steps in the production of the support structure of the invention, it has proven to be advantageous for the deformation section to be configured as a single piece with at least one of the two connection sections. It is especially advantageous in this case, of course, for the support structure to be configured as a single piece with both connection sections.

The deformation and bending properties of the overall support structure are further improved in that the recess extends at least into one of the two connection sections, preferably at least into a connection region of one of the two connection sections. In an especially advantageous embodiment of the invention, the recess extends into both connection sections, preferably as far as the respective connection region of the two connection sections. This also further improves the deformation and bending properties of the support structure, so that the safety of the passengers in a motor vehicle outfitted with at least one such support structure is further improved.

It has proven to be especially advantageous that a developed length of at least one of the two connection sections increases constantly or continuously toward one end face of the support structure. This increases the connection region, so that a better energy transmission is achieved between support structure and car body or vehicle door in event of an intrusion. Thanks to the better energy dissipation into the car body or the vehicle door, the safety of the passengers of a motor vehicle with such an outfitted support structure is further increased.

In another embodiment of the invention, the support structure has mirror symmetry in regard to a transverse plane. This is especially favorable from the standpoint of process technology, since the two connection sections are then identical in configuration.

However, it may be necessary to attach the support structure to a door or a car body such that an asymmetrical configuration of the support structure is also required. This is especially the case when the support structure is to be connected from below in the region of the vehicle's center column to an A column of the vehicle in the door hinge region.

Furthermore, it has also proven itself that the depth of the recess starting from the transverse plane becomes constantly or continuously less in the direction of the two connection sections. This also achieves an especially favorable energy dissipation from the support structure into the vehicle body or the vehicle door in event of an intrusion or an impact.

Pointing in the same direction is the embodiment of the invention whereby the width of the deformation section becomes constantly or continuously less, starting from the transverse plane, in the direction of the two connection sections.

Likewise serving this aspect is the embodiment of the support structure whereby the width of the middle web starting from the transverse plane becomes constantly or continuously less in the direction of the two connection sections.

The connection regions of the two connection sections can be arranged coplanar or in intersecting planes. Moreover, the connection sections can also be staggered in height, staggered sideways, and also rotated relative to each other. In the latter case, one should make sure that the support structure is coupled or connected to the vehicle door or vehicle body free of stress and warping.

According to an especially advantageous embodiment of the invention, the support structure consists of an aluminum alloy or of aluminum and it is preferably made by extrusion and/or press molding and/or heat treatment. Thanks to the use of aluminum or an aluminum alloy, already a reduction in weight of the support structure is achieved as compared to a support structure of steel. Although the wall thicknesses may need to be designed more thick than for a support structure of steel, one can achieve substantial savings potentials in regard to fuel consumption, since one can achieve in this way a weight savings of around 20% in regard to the support structure. This is likewise the case in comparison with a support structure of aluminum or aluminum alloy in which the wall thicknesses do not vary.

It has also proven itself to make use of production methods of extrusion, press molding and heat treatment that have already been tested in series manufacturing for the production of such support structures, since in this way the desired deformation and bending properties of the support structure can be established especially effectively and precisely.

Moreover, the support structure of the invention is characterized in that it has a tensile strength of at least 280 MPa, especially between 350 and 550 MPa.

Further goals, advantages, features and application possibilities of the present invention will emerge from the following description of a sample embodiment by means of the drawings. All described and/or depicted features in themselves or in any meaningful combination form the subject matter of the present invention, also independently of their summarization in the claims or back referencing to them.

BRIEF DESCRIPTION OF THE DRAWINGS

FIG. 5a: a sectional representation of a third sample embodiment of a support structure according to the invention in the region of a connection section, FIG. 5b: a sectional representation of the third sample embodiment of a support structure according to the invention per FIG. 5a in the region of the deformation section, FIG. 6a: a sectional representation of a fourth sample embodiment of a support structure according to the invention in the region of a connection section and FIG. 6b: a sectional representation of the fourth sample embodiment of a support structure according to the invention per FIG. 6a in the region of the deformation section.

DETAILED DESCRIPTION

Figure 1:
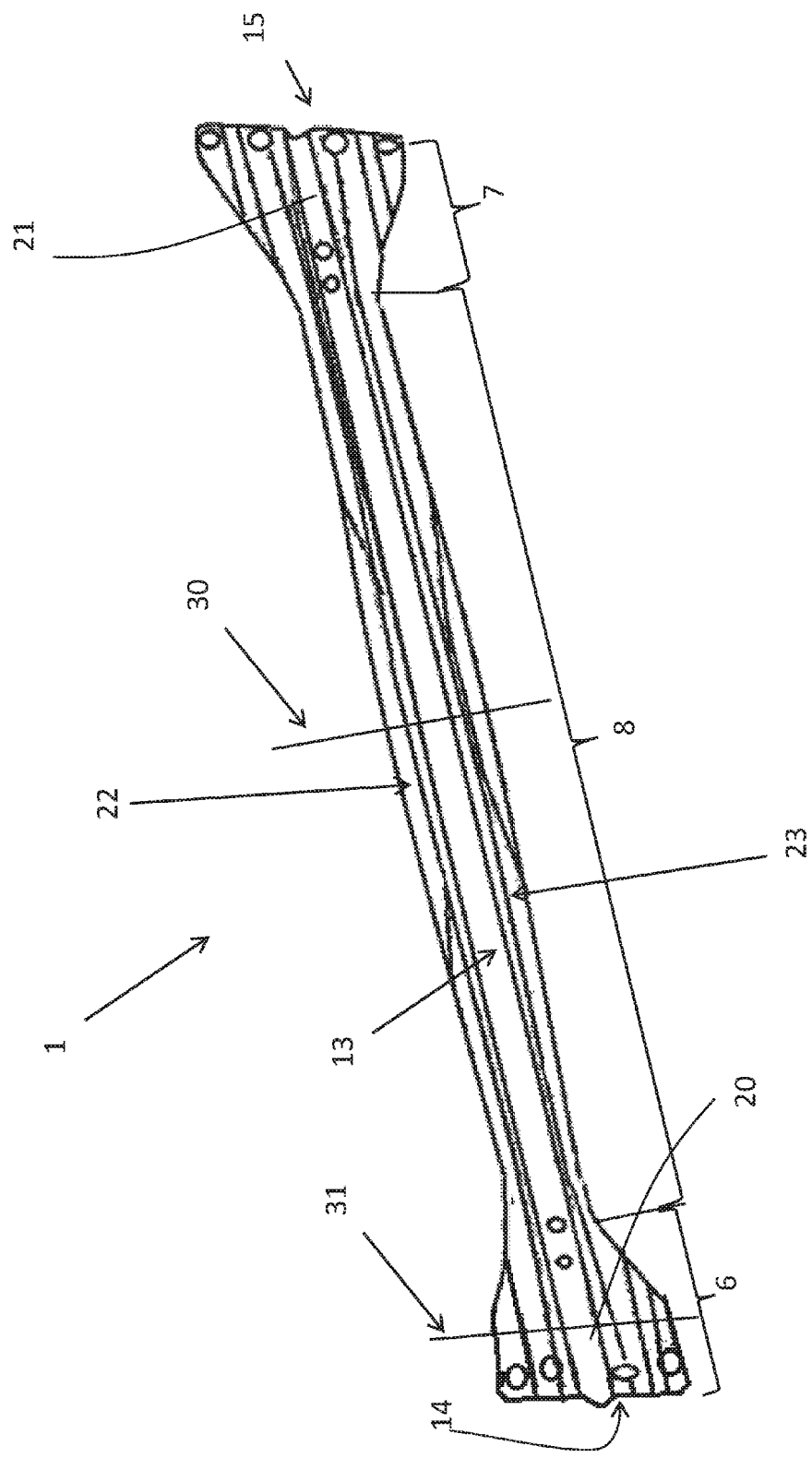
FIG. 1: a first sample embodiment of a support structure according to the invention.
Figure 3:
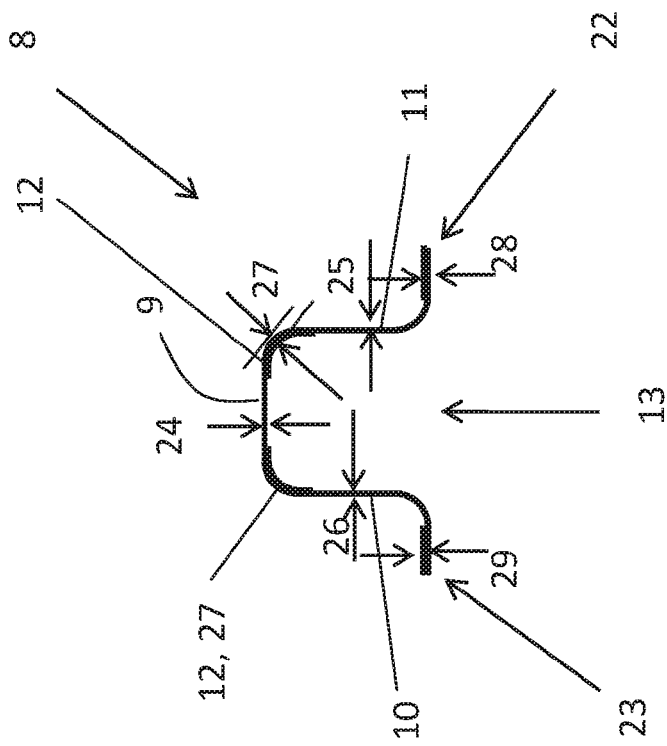
FIG. 3: a sectional representation of the support structure of FIG. 1 in the region of the deformation section.
Figure 2:
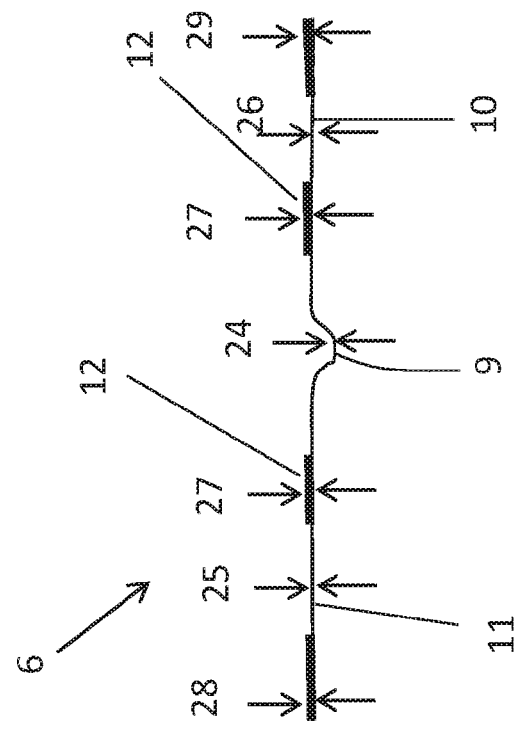
FIG. 2: a sectional representation of the support structure of FIG. 1 in the region of a connection section

FIGS. 1 to 3 show a first sample embodiment of a support structure 1 according to the invention in different views and representations.

As can already be seen from FIG. 1, the support structure 1 consists essentially of a deformation section 8, at whose ends a first connection section 6 with an end face 14 and a second connection section 7 with an end face 15 is arranged. The deformation section 8 is fashioned as a single piece with the two connection sections 6 and 7 and consists uniformly of an aluminum alloy.

In the region of the deformation section 8, the support structure 1 has a recess 13 inside a middle web 9, the middle web 9 adjoining legs 10 and 11 across connection regions 12, as is seen in particular from FIG. 3, which shows a sectional representation of the support structure 1 along the sectioning plane 30. The legs 10 and 11 are bent outward at their ends 22 and 23. FIG. 3 shows a cross section of the deformation section 8 of the support structure 1 in a transverse plane 30, which is arranged in the lengthwise dimension in the middle of the deformation section 8.

FIG. 2, on the other hand, shows a cross section of the first connection section 6 in the region of a sectioning plane 31.

As is likewise seen in FIGS. 1 to 3, the support structure 1 levels off from the U-shaped deformation section 8 toward its connection sections 6 and 7. Therefore, the middle web 9 is only minimally recessed relative to the legs 10 and 11 in the region of the connection sections 6 and 7, while in the deformation section 8 the recess 13 is distinctly recognized as being U-shaped.

In order for the support structure 1 to have the desired deformation and bending properties which are necessary in regard to safety aspects, the different elements of the support structure 1 have different wall thicknesses 24, 25, 26, 27, 28 and 29 in the deformation section 8 and the connection sections 6 and 7.

Preferably, the wall thickness 27 in the connection regions 12 is substantially greater than the wall thickness 24 of the middle web 9. While the wall thickness 24 of the middle web 9 is 3 mm, the wall thickness 27 of the connection regions 12 between middle web 9 and the legs 10 and 11 has a thickness of 4 to 6 mm, especially 5 mm. The wall thicknesses 25 and 26 of the legs 11 and 10 in this sample embodiment are also dimensioned at 2 to 4 mm, especially 3 mm, while the ends 22 and 23 of the legs 10 and 11 again have wall thicknesses 28 and 29 which have a thickness of 4 to 6 mm.

These wall thicknesses 24, 25, 26, 27, 28 and 29 are present not just in the region of the deformation section 8. Instead, they also extend into the regions of the connection sections 6 and 7.

The connection sections 6 and 7 have connection regions 20 and 21 by which they can be joined to a vehicle body or a vehicle door or the like.

The connection regions 20 and 21 are configured coplanar to each other in a plane in the sample embodiment of FIGS. 1 to 3 and they are intended to be joined to a vehicle door or a car body in order to protect the passengers of a motor vehicle against injury during a side impact.

FIGS. 4a, 4b, 5a, 5b, 6a and 6b show three further sample embodiments of a support structure 1 according to the invention, while in these sample embodiments unlike the sample embodiment of FIGS. 1 to 3 a further recess 33 has been made in the deformation section 8 in the recess 13 there, running opposite to it.

Figures 4A, 4B:
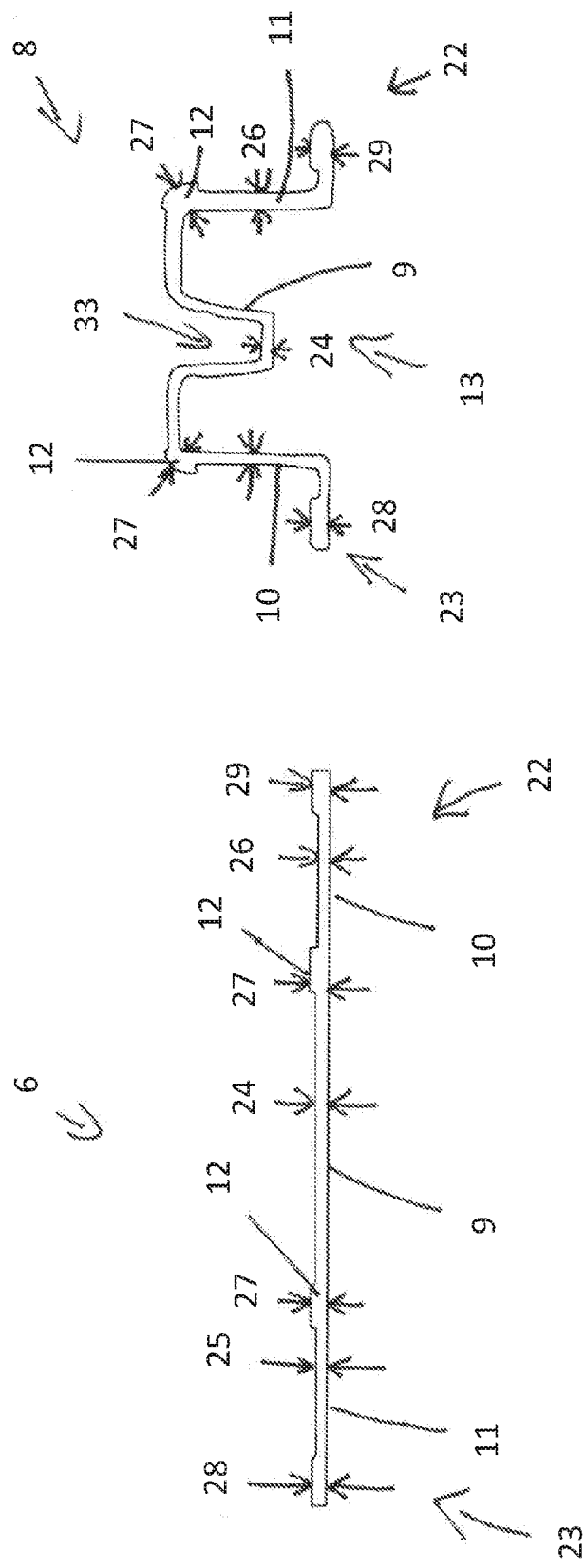
FIG. 4a: a sectional representation of a second sample embodiment of a support structure according to the invention in the region of a connection section.
FIG. 4b: a sectional representation of the second sample embodiment of a support structure according to the invention per FIG. 4a in the region of the deformation section.

In the sample embodiment of FIGS. 4a and 4b, as in the sample embodiment of FIGS. 1 to 3, in order to achieve the desired deformation and bending properties which are necessary in regard to safety aspects, the different elements of the support structure 1 have different wall thicknesses 24, 25, 26, 27, 28 and 29 in the deformation section 8 and the connection sections 6 and 7. Preferably, in this sample embodiment as well, the wall thickness 27 in the connection regions 12 is substantially larger than the wall thickness 24 of the middle web 9. While the wall thickness 24 of the middle web 9 is 3 mm, the wall thickness 27 of the connection regions 12 between middle web 9 and the legs 10 and 11 has a thickness of 4 to 6 mm. The wall thicknesses 25 and 26 of the legs 11 and 10 in this sample embodiment are also dimensioned at 2 to 4 mm, while the ends 22 and 23 of the legs 10 and 11 in turn have wall thicknesses 28 and 29 which again have a thickness of 4 to 6 mm.

In contrast to this, in the sample embodiment of FIGS. 5a and 5b only the wall thicknesses 28 and 29 of the ends 22 and 23 of the legs 10 and 11 are thicker relative to the wall thicknesses of the other regions.

In the sample embodiment of FIGS. 6a and 6b, once again only the wall thicknesses 27 of the connection regions 12 are thicker relative to the wall thicknesses of the other regions.

LIST OF REFERENCE NUMBERS 1 support structure
6 first connection section
7 second connection section
8 deformation section
9 middle web
10 leg
11 leg
12 connection regions 13 recess
14 end face
15 end face
20 connection region
21 connection region
22 end
23 end
24 wall thickness
25 wall thickness
26 wall thickness
27 wall thickness
28 wall thickness
29 wall thickness
30 transverse plane, sectioning plane
31 sectioning plane
33 recess

What is claimed is:

1. A support structure for a motor vehicle comprising:
a first connection section;
a second connection section; and
a deformation section, wherein the deformation section is arranged between the first connection section and the second connection section, wherein the deformation section is provided in its lengthwise dimension with a recess formed from a middle web and legs joined to it by connecting regions, and the legs run out in ends, wherein the deformation section is fashioned as a single piece and at least one of a) the wall thickness in the connection regions is at least partly along the lengthwise dimension of the deformation section and is at least 20% larger than at least one of the wall thickness of the middle web and the legs, and b) the ends of the legs have a wall thickness which for at least a portion of the lengthwise dimension of the deformation section is at least 20% greater than the wall thickness of at least one of the middle web and the legs.

2. The support structure as claimed in claim 1, wherein the recess of the deformation section is essentially U-shaped, with the legs connected to the middle web of the recess being bent outward at their ends.

3. The support structure as claimed in claim 1, wherein the ends of the legs extend into a connection region of at least one connection section.

4. The support structure as claimed in claim 1, wherein the deformation section is configured as a single piece with at least one of the two connection sections.

5. The support structure as claimed claim 1, wherein the recess extends at least into one of the two connection sections, preferably at least into a connection region of one of the two connection sections in which the actual connection of the support structure to the motor vehicle occurs.

6. The support structure as claimed in claim 1, wherein a developed length of at least one of the two connection sections increases constantly or continuously toward one end face of the support structure.

7. The support structure as claimed in claim 1, wherein the recess has a depth which becomes constantly or continuously less, starting from the transverse plane, in the direction of the two connection sections.

8. The support structure as claimed in claim 1, wherein the deformation section has a width which becomes constantly or continuously less, starting from the transverse plane, in the direction of the two connection sections.

9. The support structure as claimed in claim 1, wherein the middle web has a width which, starting from the transverse plane, becomes constantly or continuously less in the direction of the two connection sections.

10. The support structure as claimed in claim 1, wherein the connection regions of the two connection sections are arranged coplanar or in intersecting planes.

11. The support structure as claimed in claim 1, wherein the support structure consists of an aluminum alloy.

12. The support structure as claimed in claim 1, wherein it has a tensile strength of at least 250 MPa, especially between 300 and 550 MPa.

13. The support structure as claimed in claim 11, wherein the support structure is made by extension or roll profiling and press molding.

14. The support structure as claimed in claim 13, wherein the support structure is further made by heat treatment.

15. The support structure as claimed in claim 1, wherein the deformation section is U-shaped.

* * * * *